United States Patent
Deng et al.

(10) Patent No.: US 10,802,472 B2
(45) Date of Patent: Oct. 13, 2020

(54) METHOD AND APPARATUS FOR CONTROLLING MOTOR VIBRATION

(71) Applicant: AAC Technologies Pte. Ltd., Singapore (SG)

(72) Inventors: Hanlin Deng, Shenzhen (CN); Liang Jiang, Shenzhen (CN); Zheng Xiang, Shenzhen (CN); Tao Li, Shenzhen (CN); Wensheng Xu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/234,746

(22) Filed: Dec. 28, 2018

(65) Prior Publication Data
US 2019/0235475 A1  Aug. 1, 2019

(30) Foreign Application Priority Data

Jan. 29, 2018 (CN) .......................... 2018 1 0085902

(51) Int. Cl.
G05B 19/416 (2006.01)
(52) U.S. Cl.
CPC .. *G05B 19/416* (2013.01); *G05B 2219/41128* (2013.01)
(58) Field of Classification Search
CPC ........................................ G05B 2219/41128
USPC ........................................................ 700/280
See application file for complete search history.

(56) References Cited

U.S. PATENT DOCUMENTS

| | | | |
|---|---|---|---|
| 2005/0207584 A1* | 9/2005 | Bright | H04R 3/007 381/59 |
| 2013/0278400 A1* | 10/2013 | Harris | G06F 3/0436 340/407.1 |
| 2016/0030240 A1* | 2/2016 | Gonenc | G01L 5/226 604/95.01 |

OTHER PUBLICATIONS

Lindsay, "A Mechanical Amplifier for Haptic Feedback" Master's Thesis, University of Washington 2013, 44 Pgs. (Year: 2013).*

(Continued)

*Primary Examiner* — Emilio J Saavedra
(74) *Attorney, Agent, or Firm* — IPro, PLLC; Na Xu

(57) ABSTRACT

The present disclosure relates to the technical field of electronic devices, and discloses a method and an apparatus for controlling motor vibration. The method includes: obtaining an input signal based on an expected motor vibration curve, inputting a digital signal sequence of the input signal to an equalizer, and obtaining an output signal after processing by the equalizer, and inputting the output signal to a motor to control vibration of the motor, where the equalizer is a digital filter constructed based on a damping factor $\zeta$ and a resonance frequency $\omega_n$ of the motor, and a preset system sampling frequency $f_s$, a preset damping factor $\zeta_d$, and a preset cut-off frequency $\omega_d$. The method and apparatus provided in embodiments of the present disclosure have an advantage that an actual vibration effect of the motor can be consistent with an expected motor vibration curve.

11 Claims, 7 Drawing Sheets

(56) References Cited

OTHER PUBLICATIONS

Heyward et al., "Do It Yourself Haptics, Part I" IEEE Robotics & Automation Magazine, Dec. 2007, pp. 88-104 (Year: 2007).*
https://web.archive.org/web/20130814151233/https://en.wikipedia.org/wiki/Vibration, accessed Aug. 14, 2013, 10 pgs. printout (Year: 2013).*

* cited by examiner

METHOD AND APPARATUS FOR CONTROLLING MOTOR VIBRATION

CROSS-REFERENCE TO RELATED APPLICATIONS

This application claims the priority benefit of Chinese Patent Applications Ser. No. 201810085902.8 filed on Jan. 29, 2018, the entire content of which is incorporated herein by reference.

TECHNICAL FIELD

The present disclosure relates to the technical field of electronic devices, and in particular, to a motor control method and apparatus.

BACKGROUND

As hardware and related software applications are constantly upgraded and improved, in addition to a basic function of communication, smartphones constantly bring surprises to users in visual and auditory experience and a human-machine interaction process, and mobile phones deeply affect daily life of individuals in aspects such as socializing, entertainment, study, and work.

As technologies in the mobile phone industry develop and evolve and professional levels of users improve, haptic experience is no longer supplementary vibration of ringtones and message alert tones. Gradually, haptic experience starts to deeply integrate with visual scenarios and sound effects in human-machine interaction processes and applications, and explains and develops new functions of smartphones from another dimension. From the perspective of an industry development trend, vivid diverse haptic experience is an indispensable key quality of high-end smartphones. The existing haptic experience of smartphones is generated by motor vibration, and a motor vibration effect depends on a control signal. Therefore, theoretical analysis is usually performed based on an expected motor vibration effect to obtain an expected motor vibration curve, and a control signal is obtained by using the expected motor vibration curve.

However, the inventor of the present disclosure finds that in the existing technologies, only a relationship between a motor vibration displacement and different haptic effects to design a target motor displacement curve is usually studied and analyzed, and no specific technology of controlling motor vibration is involved. However, because of different motor properties, it is highly possible that the control signal obtained by using the expected motor vibration curve cannot control a motor to achieve an expected motor vibration effect.

BRIEF DESCRIPTION OF THE DRAWINGS

One or more embodiments are exemplarily described with reference to the corresponding accompanying drawings, and the exemplary descriptions constitute no limitation on the embodiments. Elements with same reference numerals in the accompanying drawings indicate similar components. Unless otherwise described, the accompanying drawings constitute no proportion limitation.

DETAILED DESCRIPTION

To make the objectives, technical solutions, and advantages of the present disclosure clearer, the following embodiments of the present disclosure are described in detail with reference to the accompanying drawings. However, a person of ordinary skill in the art may understand that in the embodiments of the present disclosure, many technical details are provided so that a reader better understands the present disclosure. However, even though the technical details and various changes and modifications in the following embodiments are not provided, the technical solutions claimed in the present disclosure can be implemented.

Figure 1:
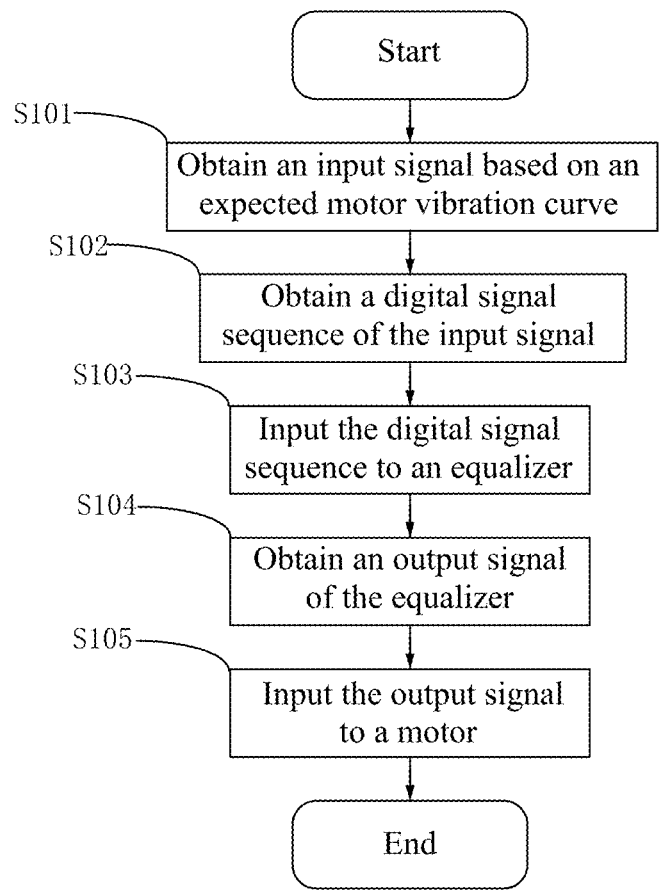
FIG. 1 is a flowchart of a method for controlling motor vibration according to a first embodiment of the present disclosure.

A first embodiment of the present disclosure relates to a method for controlling motor vibration. As shown in FIG. 1, a specific procedure includes:

Step S101: An input signal is obtained based on an expected motor vibration curve.

Specifically, the expected motor vibration curve is a vibration curve that is presented when a motor vibrates with an expected vibration effect, and the input signal obtained based on the expected motor vibration curve includes a feature of reaching the expected motor vibration effect, so that an actual vibration effect of the motor is controlled to have a certain similarity with the expected motor vibration effect. In this step, the input signal to be inputted to the motor is obtained based on the expected motor vibration curve.

Step S102: A digital signal sequence of the input signal is obtained.

Specifically, in this embodiment, the input signal obtained based on the expected motor vibration curve is an analog signal, and in this step, the obtained analog signal needs to be converted into the digital signal sequence, to improve fidelity of the input signal.

Step S103: The digital signal sequence is inputted to an equalizer.

In this embodiment, the equalizer is a digital filter, and the equalizer calculates an output signal based on a calculation formula of the equalizer after the digital signal sequence is inputted to the equalizer. Furthermore, in this embodiment, the equalizer is a second-order recursive digital filter. By using the second-order recursive digital filter, design workload of the equalizer is relatively small, and a requirement on a calculation tool is not high, so that the present disclosure can be used in a simpler manner and the application range is wider. It should be noted that during construction of the equalizer, a damping factor $\zeta$ and a resonance frequency $\omega_n$ of the motor are first measured, and the equalizer is constructed jointly with reference to a preset system sampling frequency $f_s$, a preset damping factor $\zeta_d$, and a preset cut-off frequency $\omega_d$. Because the equalizer is constructed based on the damping factor $\zeta$ and the resonance frequency $\omega_n$ of the motor, the output signal obtained after the equalizer processes the digital signal sequence also includes corresponding features of the damping factor $\zeta$ and the resonance frequency $\omega_n$ of the motor. Meanwhile, with reference to the preset system sampling frequency $f_s$, the preset damping factor $\zeta_d$, and the preset cut-off frequency $\omega_d$, the output signal can control an actual vibration effect of the motor to be closer to a preset vibration effect, and similarity between the actual vibration curve of the motor and the expected motor vibration curve can be improved.

In this embodiment, a method of measuring the damping factor $\zeta$ and the resonance frequency $\omega_n$ of the motor may be a vibration frequency sweep method or may be an impedance curve measurement method, and the two methods can both measure the damping factor $\zeta$ and the resonance frequency $\omega_n$ of the motor very accurately in practice. It may be understood that in an actual use process, there are many methods of measuring the damping factor $\zeta$ and the resonance frequency $\omega_n$ of the motor, and whatever method is used for measurement does not affect execution of the embodiments of the present disclosure.

Specifically, in this embodiment, a formula for constructing the equalizer based on the damping factor $\zeta$ and the resonance frequency $\omega_n$ of the motor, and the preset system sampling frequency $f_s$, the preset damping factor $\zeta_d$, and the preset cut-off frequency $\omega_d$ is:

$$H(z) = \frac{1 + b_1 z^{-1} + b_2 z^{-2}}{1 + a_1 z^{-1} + a_2 z^{-2}},$$

Where z is the digital signal sequence inputted to the equalizer, H(z) is a transmission function of the equalizer, and $a_1$, $a_2$, $b_1$, and $b_2$ are coefficients in the formula and are calculated by using the following method:

$a_1 = -2e^{-\zeta_d \omega_d/f_s} \cos(\sqrt{1-\zeta_d^2}\, \omega_d/f_s);$ $a_2 = e^{-2\zeta_d \omega_d/f_s};$ $b_1 = -2e^{-\zeta \omega_n/f_s} \cos(\sqrt{1-\zeta^2}\, \omega_n/f_s);$ and $b_2 = e^{-2\zeta \omega_n/f_s}.$ Based on the formula, the output signal related to the remotely controlled motor and the expected motor vibration effect can be calculated after the digital signal sequence is inputted, thereby improving the similarity between the actual vibration curve of the motor and the expected motor vibration curve.

Step S104: An output signal of the equalizer is obtained.

Specifically, after the digital signal sequence is inputted to the equalizer, the equalizer calculates to obtain a new digital signal sequence based on the above formula, and then obtains the output signal of the equalizer based on the new digital signal sequence. The equalizer processes the input signal by using a method for processing the digital signal sequence, so that fidelity of the signal can be higher in a processing process. The output signal controls motor vibration with a better effect, thereby improving the similarity between the actual vibration curve of the motor and the expected motor vibration curve.

Step S105: The output signal of the equalizer is inputted to a motor to control vibration of the motor.

Specifically, after the equalizer calculates to obtain the output signal based on the digital signal sequence of the input signal by using the above formula, the output signal includes related information of the damping factor $\zeta$ and the resonance frequency $\omega_n$ of the motor, and the preset system sampling frequency $f_s$, the preset damping factor $\zeta_d$, and the preset cut-off frequency $\omega_d$. When the output signal is inputted to the motor to control motor vibration, the similarity between the actual vibration effect of the motor and the preset motor vibration effect can be effectively improved, and the similarity between the actual vibration curve of the motor and the expected motor vibration curve can be improved.

Compared with the existing technologies, in the method for controlling motor vibration provided in the first embodiment of the present disclosure, before the input signal obtained based on the expected motor vibration curve is inputted to the motor to control motor vibration, the equalizer is used to process the input signal, and the output signal obtained after processing by the equalizer is inputted to the motor to control motor vibration. Because the equalizer is constructed by using the damping factor $\zeta$ and the resonance frequency $\omega_n$ of the motor obtained by measurement, together with the preset system sampling frequency $f_s$, the preset damping factor $\zeta_d$ and the preset cut-off frequency $\omega_d$, the output signal processed by using the transmission function H(z) of the equalizer includes related parameters of the motor, so that the similarity between the actual vibration effect of the motor and the expected motor vibration effect is improved, and the similarity between the actual vibration curve of the motor and the expected motor vibration curve is improved.

Figure 2:
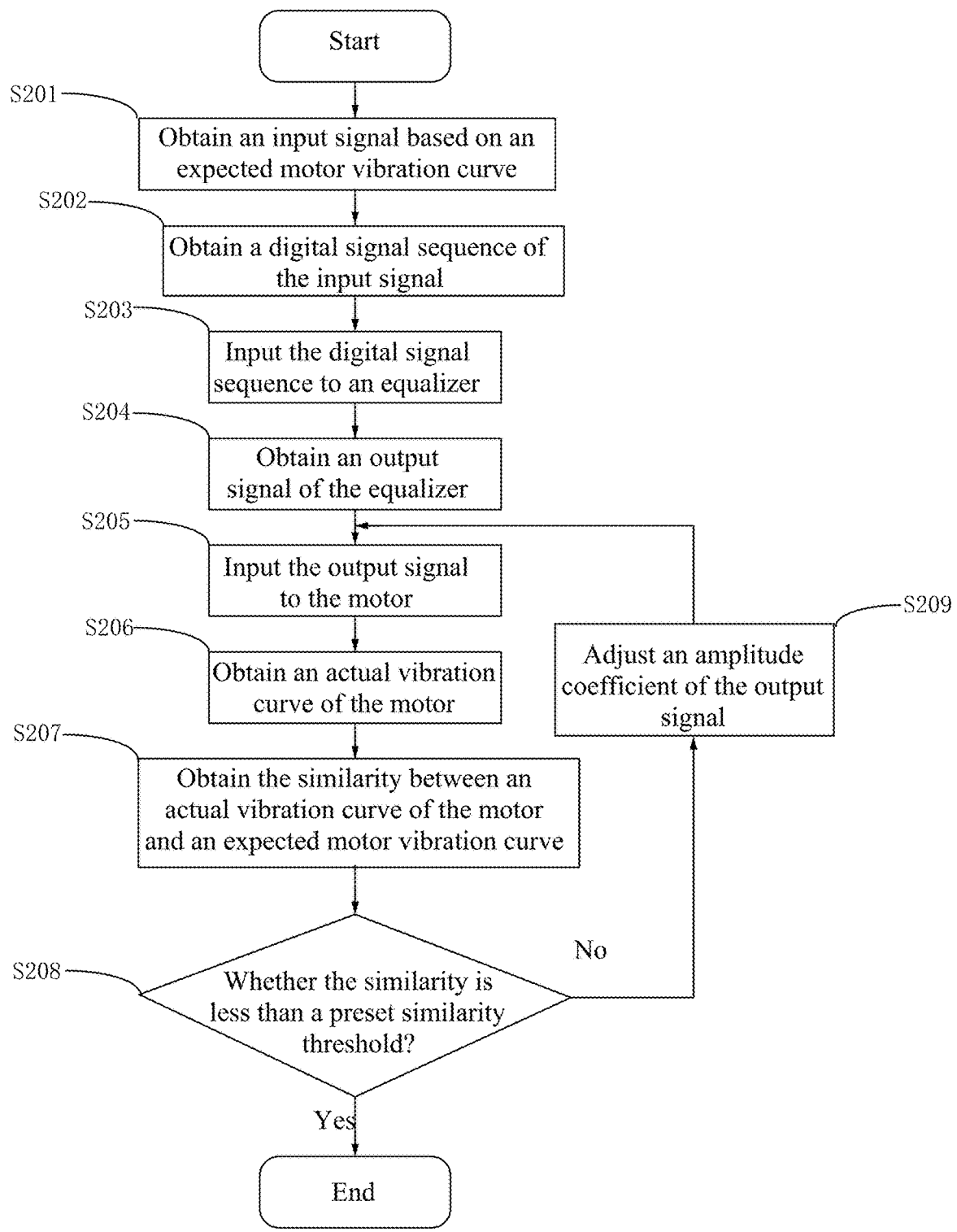
FIG. 2 is a flowchart of a method for controlling motor vibration according to a second embodiment of the present disclosure.

A second embodiment of the present disclosure relates to a method for controlling motor vibration. This embodiment is further improved based on the first embodiment, and a specific improvement is as follows: in the second embodiment of the present disclosure, after the output signal of the equalizer is inputted to the motor to control motor vibration, it is further determined whether the similarity between the actual vibration curve of the motor controlled by the output signal of the equalizer and the expected motor vibration curve is less than a preset similarity threshold, and when the similarity is less than the preset similarity threshold, amplitude adjustment processing is performed on the output signal of the equalizer again, to ensure that the similarity between the actual vibration curve of the motor and the expected motor vibration curve can reach the preset similarity threshold. As shown in FIG. 2, the method includes the following steps:

Step S201: An input signal is obtained based on an expected motor vibration curve.

Step S202: A digital signal sequence of the input signal is obtained.

Step S203: The digital signal sequence is inputted to an equalizer.

Step S204: An output signal of the equalizer is obtained.

Step S205: The output signal is inputted to the motor.

Step S201 to step S205 in this embodiment are approximately the same as step S101 to step S105 in the first embodiment, and aim to process the input signal via the equalizer to obtain the output signal that is used to control motor vibration, and to input the output signal to the motor to control motor vibration. Therefore, details are not described herein again. Step S206: An actual vibration curve of the motor is obtained.

Specifically, in this embodiment, after the output signal is inputted to the motor, the output signal controls motor vibration. In this case, real-time vibration amplitudes of the motor may be measured, and the actual vibration curve of the motor is drawn based on the measured vibration amplitudes. In this embodiment, a laser distance measurement sensor or a Hall sensor measures the real-time vibration amplitudes of the motor. The actual vibration amplitude of the motor can be effectively measured by using the two methods. It may be understood that in an actual application, a method for measuring the actual vibration amplitude of the motor is not limited to the two sensors, and may further be other sensors or other methods for measuring motor vibration. Examples are not listed one by one herein, and replacements of measurement method do not affect execution of the embodiments.

Step S207: The similarity between an actual vibration curve of the motor and an expected motor vibration curve is obtained.

In this embodiment, after the actual vibration curve of the motor is obtained, the actual vibration curve of the motor may be compared with the expected motor vibration curve, to obtain the similarity between the actual vibration curve of the motor and the expected motor vibration curve. Specifically, some data of the actual vibration curve of the motor, for example, an amplitude, a frequency, and the like may be compared with same parameters of the expected motor vibration curve, to obtain the similarity between the actual vibration curve of the motor and the expected motor vibration curve. It should be noted that when the actual vibration curve of the motor is compared with the parameters of the expected motor vibration curve, the same parameters need to be compared. To be specific, an amplitude is compared with an amplitude and a frequency is compared with a frequency, to obtain the similarity between the actual vibration curve of the motor and the expected motor vibration curve.

Step S208: Whether the similarity is less than a preset similarity threshold is determined. If the similarity is less than the preset similarity threshold, step S209 is performed; or if the similarity is greater than or equal to the preset similarity threshold, the procedure is ended.

Specifically, the preset similarity threshold is a criterion of expected similarity between the actual vibration curve of the motor and the expected motor vibration curve. If the similarity between the actual vibration curve of the motor and the expected motor vibration curve is less than the preset similarity threshold, it indicates that the actual vibration curve of the motor and the expected motor vibration curve are greatly different, and motor vibration does not reach the expected vibration effect. Therefore, processing needs to be further performed, that is, step S209 is performed.

Step S209: An amplitude coefficient of the output signal is adjusted.

Specifically, when it is determined in step S208 that the similarity between the actual vibration curve of the motor and the expected motor vibration curve is less than the preset similarity threshold, that is, motor vibration cannot reach the expected effect, the output signal of the equalizer is adjusted again, to reduce the similarity difference between the actual vibration curve of the motor and the expected motor vibration curve. The output signal whose amplitude coefficient is adjusted is inputted to the motor, step S205 to step S208 are performed again, and so on, until under control of the output signal, the similarity between the actual vibration curve of the motor and the expected motor vibration curve is greater than or equal to the preset similarity threshold, that is, the actual vibration effect of the motor reaches the preset motor vibration effect.

Compared with the existing technologies, in this embodiment based on the first embodiment of the present disclosure, when the similarity between the actual vibration curve of the motor and the expected motor vibration curve is less than the preset similarity threshold, the operation of adjusting the amplitude coefficient of the output signal is added. After the amplitude coefficient of the output signal is adjusted repeatedly, the similarity between the expected motor vibration curve and the actual vibration curve of the motor may be greater than or equal to the preset similarity threshold, that is, the similarity between the actual vibration curve of the motor and the expected motor vibration curve can be further improved, until the similarity between the actual vibration curve of the motor and the expected motor vibration curve is improved to satisfy the preset criterion.

Figure 3:
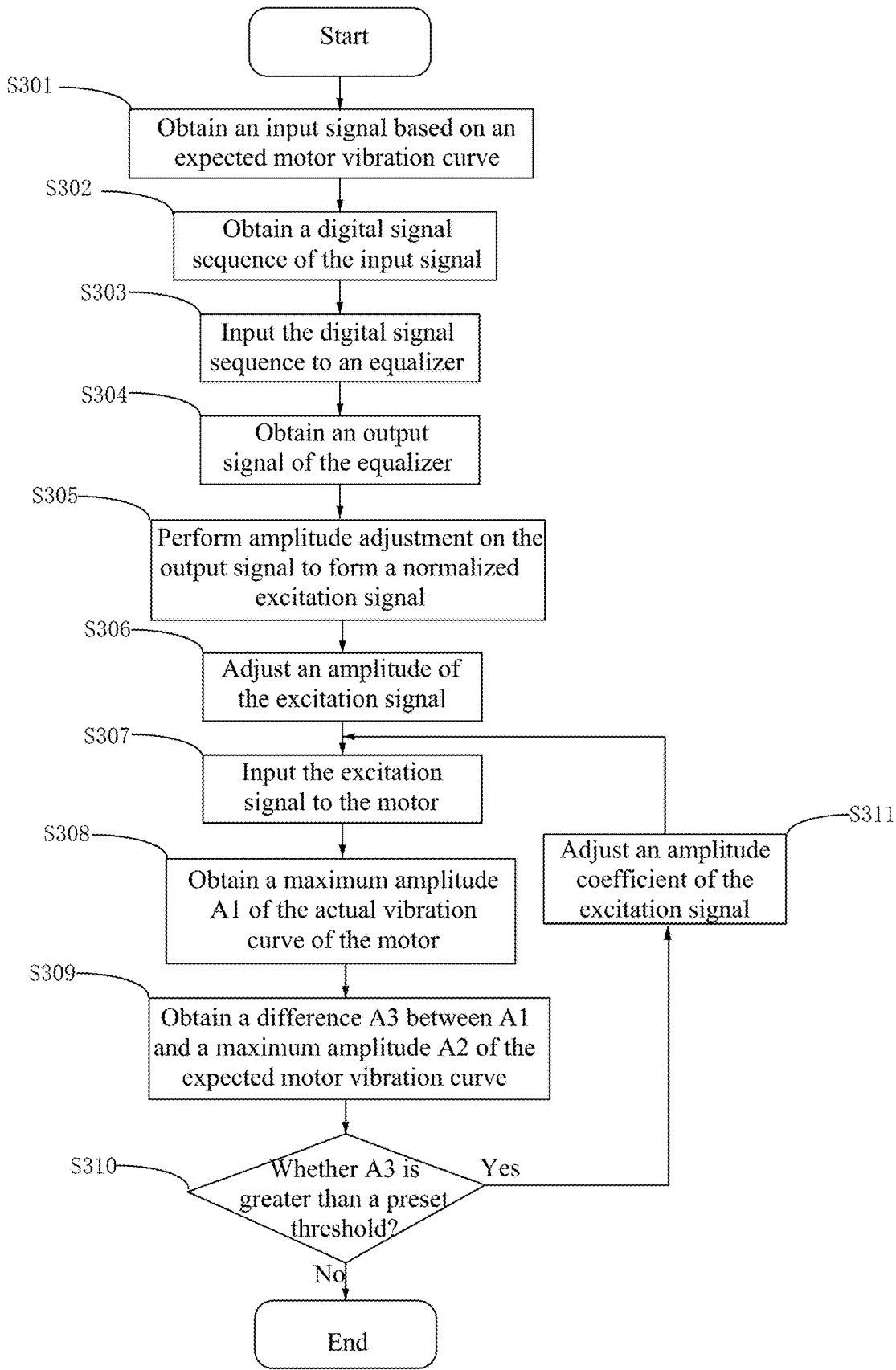
FIG. 3 is a flowchart of a method for controlling motor vibration according to a third embodiment of the present disclosure.

A third embodiment of the present disclosure relates to a method for controlling motor vibration. This embodiment is further improved based on the first embodiment or the second embodiment, and a specific improvement is as follows: before the output signal is inputted to the motor to control motor vibration, amplitude adjustment is performed on the output signal to form the normalized excitation signal, and the excitation signal obtained after amplitude adjustment is performed again is inputted to the motor, to control motor vibration. Therefore, the similarity between the actual vibration curve of the motor that is presented when the excitation signal is inputted to the motor for the first time and the expected motor vibration curve is improved, to reduce a quantity of times of adjusting the amplitude of the excitation signal again so that the similarity between the actual vibration curve of the motor and the expected motor vibration curve is greater than or equal to the preset similarity threshold. As shown in FIG. 3, the method includes the following steps:

Step S301: An input signal is obtained based on an expected motor vibration curve.

Step S302: A digital signal sequence of the input signal is obtained.

Step S303: The digital signal sequence is inputted to an equalizer.

Step S304: An output signal of the equalizer is obtained.

Step S305: Amplitude adjustment on the output signal is performed to form a normalized excitation signal.

In this step, after the digital signal sequence of the input signal is processed by the equalizer to obtain the output signal, amplitude adjustment is performed on the output signal. Specifically, amplitude adjustment is performed on the entire output signal with equal proportions to form a new normalized excitation signal.

Step S306: An amplitude of the excitation signal is adjusted.

After the normalized excitation signal is obtained, the amplitude of the excitation signal is further adjusted by using a preset initial amplitude proportion factor.

Step S307: The excitation signal is inputted to the motor.

In this step, the normalized excitation signal whose amplitude is adjusted by using the preset initial amplitude proportion factor is inputted to the motor, to control motor vibration. Because amplitude adjustment is performed on the output signal of the equalizer with equal proportions, and amplitude adjustment is performed again based on the preset initial amplitude proportion factor, after the excitation signal is inputted to the motor to control motor vibration, the similarity between the actual vibration curve of the motor and the expected motor vibration curve can be further improved when the excitation signal is initially inputted to the motor.

Step S308: A maximum amplitude A1 of the actual vibration curve of the motor is obtained.

In this step, after the excitation signal is inputted to the motor, the excitation signal controls motor vibration. In this case, the real-time vibration amplitude of the motor can be measured, the actual vibration curve of the motor is drawn based on the measured vibration amplitudes, and the maximum amplitude, that is, A1 is obtained from the actual vibration curve of the motor.

Step S309: A difference A3 between A1 and a maximum amplitude A2 of the expected motor vibration curve is obtained.

Specifically, the maximum amplitude A2 may be directly obtained from the expected motor vibration curve, and an absolute value of the difference between A1 and A2 is obtained, to obtain A3.

Step S310: Whether A3 is greater than a preset threshold is determind. If A3 is greater than the preset threshold, step S311 is performed, or if A3 is not greater than the preset threshold, the procedure is ended.

Specifically, the preset threshold is a fixed value set based on the maximum amplitude of the expected motor vibration curve, and the preset threshold is an acceptable maximum difference between the maximum amplitude of the actual vibration curve of the motor and the maximum amplitude of the expected motor vibration curve. If A3 is greater than the preset threshold, it indicates that the actual vibration curve of the motor and the expected motor vibration curve are excessively different, and the similarity does not reach a criterion and step S311 is performed. If A3 is not greater than the preset threshold, it indicates that the similarity between the actual vibration curve of the motor and the expected motor vibration curve reaches the criterion, and another operation is not required.

Step S311: An amplitude coefficient of the excitation signal is adjusted.

Step S301 to step S304 and step S311 in this embodiment are approximately the same as step S201 to step S204 and step S209 in the second embodiment, and aim to process the input signal by using the equalizer to obtain the output signal controlling motor vibration, and adjust the amplitude coefficient of the signal inputted to the motor, to improve the similarity between the actual vibration curve of the motor and the expected motor vibration curve, until the preset criterion is satisfied. Therefore, details are not described herein again.

Compared with the existing technologies, this embodiment is improved based on the second embodiment and has all the advantages of the second embodiment. Further, before the output signal is inputted to the motor to control motor vibration, amplitude adjustment is performed on the output signal to form the normalized excitation signal, and the excitation signal obtained after amplitude adjustment is performed again is inputted to the motor, to control motor vibration. Before the output signal of the equalizer is first inputted to the motor, amplitude adjustment processing is performed on the output signal to form the excitation signal. When the excitation signal is first inputted to the motor, the similarity between the actual vibration curve of the motor and the expected motor vibration curve is effectively improved, thereby reducing a quantity of operations of adjusting the amplitude coefficient of the excitation signal in the subsequent step S311, and simplifying the entire motor control method.

Figure 4:
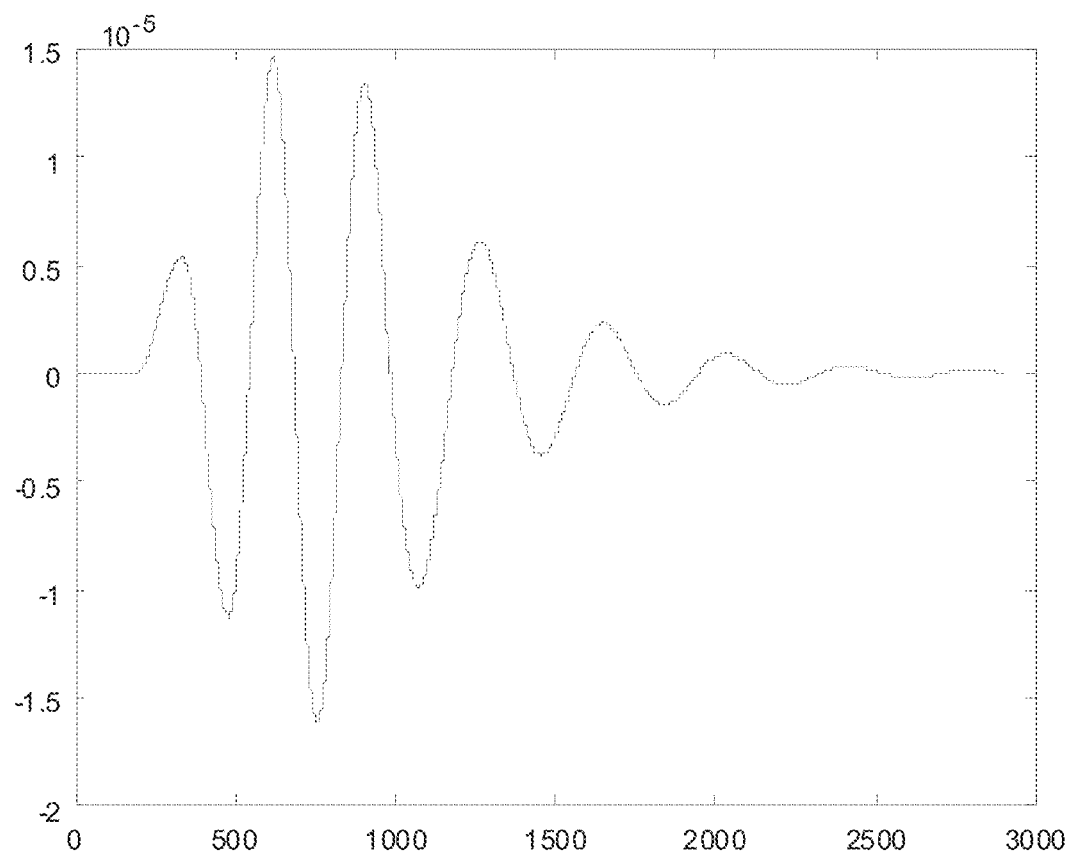
FIG. 4 is a schematic diagram of an expected motor vibration curve of a method for controlling motor vibration according to the third embodiment of the present disclosure.
Figure 5:
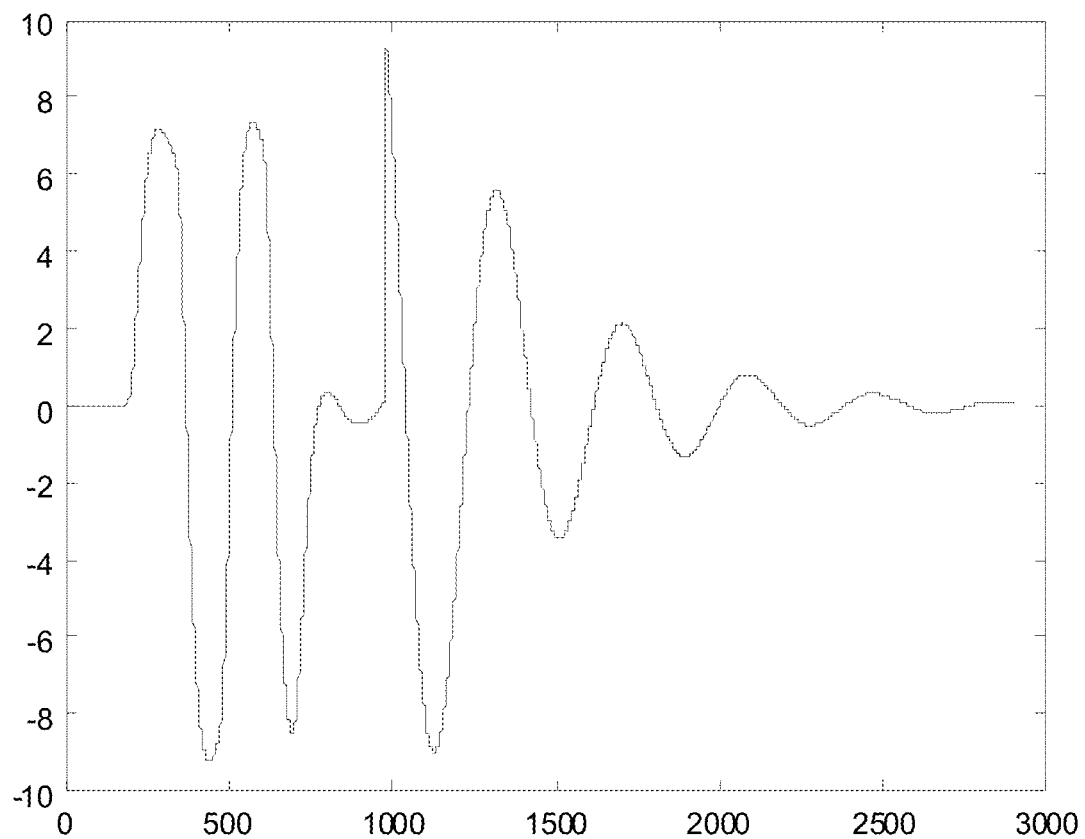
FIG. 5 is a schematic diagram of an excitation signal of a method for controlling motor vibration according to the third embodiment of the present disclosure.
Figure 6:
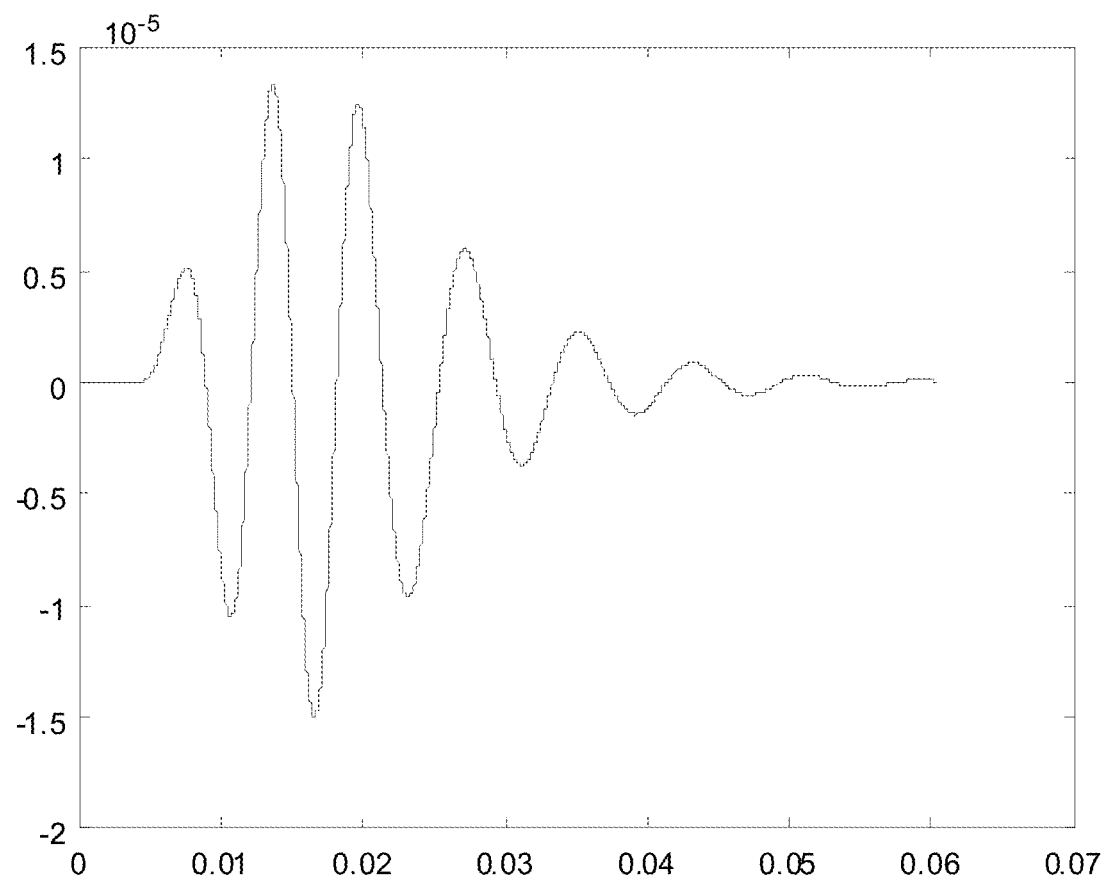
FIG. 6 is a schematic diagram of an actual vibration curve of a motor of a method for controlling motor vibration according to the third embodiment of the present disclosure.

The following specifically describes technical effects of the third embodiment of the present disclosure. First, the expected motor vibration curve is shown in FIG. 4, FIG. 5 shows an image of the excitation signal obtained after processing in steps S301 to S306 is performed, and FIG. 6 shows the actual vibration curve of the motor that is obtained after the third embodiment of the present disclosure is implemented. As can be learned by comparing FIG. 4 and FIG. 6, the method for controlling motor vibration provided in the third embodiment of the present disclosure can control the difference between the actual vibration curve of the motor and the expected motor displacement curve to be relatively small, so that the actual vibration effect of the motor reaches the expected motor vibration effect.

Figure 7:
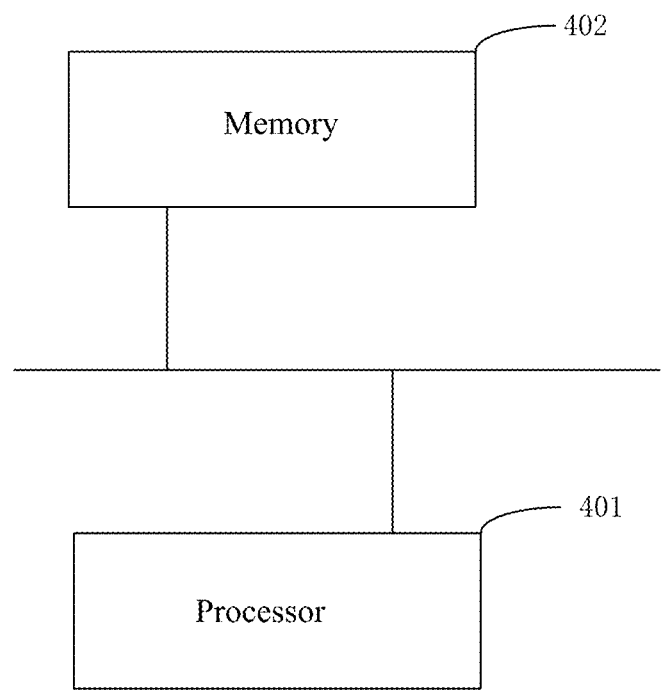
FIG. 7 is a schematic structural diagram of an apparatus for controlling motor vibration according to a fourth embodiment of the present disclosure.

A fourth embodiment of the present disclosure relates to a apparatus for controlling motor vibration. The apparatus includes: at least one processor 401 and a memory 402 in communication connection with the at least one processor 401, as shown in FIG. 7. The memory 402 stores instructions executable by the at least one processor 401. The instructions, when executed by the at least one processor 401, cause the at least one processor 401 to perform the method controlling motor vibration as described above.

The memory 402 and the processor 401 are connected via a bus. The bus may include any quantity of interconnected buses and bridges, and the bus connects various circuits of one or more processors 401 and the memory 402. The bus may further connect various other circuits such as a peripheral device, a voltage regulator, a power management circuit, and the like. These are well known in the art and therefore are not further described in this specification. A bus interface provides an interface between the bus and a transceiver. The transceiver may be one component or may be a plurality of components, for example, a plurality of receivers and transmitters, and provides a unit configured to communicate with various other apparatuses on a transmission medium. Data processed by the processor 401 is transmitted on a wireless medium by using an antenna. Further, the antenna further receives data and transmits the data to the processor 401.

The processor 401 is responsible for bus management and general processing and may further provide various functions including timing, a peripheral interface, voltage adjustment, power supply management, and other control functions. The memory 402 may be configured to store data used by the processor 401 to perform an operation.

A person skilled in the art may understand that some or all steps of the methods of the foregoing embodiments may be performed by instructing related hardware via a program. The program is stored in a storage medium, and includes several instructions for enabling a device (which may be a single-chip microcomputer, a chip, or the like) or a processor to perform some or all steps of the methods of the embodiments of this application. The foregoing storage medium includes various mediums that can store program code, such as a USB flash disk, a removable hard disk, a read-only memory (ROM), a random access memory (RAM), a magnetic disk, or an optical disc.

A person of ordinary skill in the art may understand that the foregoing embodiments are specific embodiments for implementing the present disclosure, and may be changed in various manners in forms and details without departing from the spirit and scope of the present disclosure in actual applications.

What is claimed is:

1. A method for controlling motor vibration, comprising:
obtaining an input signal based on an expected motor vibration curve;
inputting a digital signal sequence of the input signal to an equalizer, and obtaining an output signal after processing by the equalizer; and
inputting the output signal to a motor to control vibration of the motor;
wherein the equalizer is a digital filter constructed based on a damping factor $\zeta$ and a resonance frequency $\omega_n$ of the motor, and a preset system sampling frequency $f_s$, a preset damping factor $\zeta_d$, and a preset cut-off frequency $\omega_d$; wherein,
the equalizer is a second-order recursive digital filter constructed based on the following formula:

$$H(z) = \frac{1 + b_1 z^{-1} + b_2 z^{-2}}{1 + a_1 z^{-1} + a_2 z^{-2}},$$

Wherein z is the digital signal sequence inputted to the equalizer, H(z) is a transmission function of the second-order recursive digital filter, and $a_1$, $a_2$, $b_1$ and $b_2$ are coefficients in the formula and are calculated by using the following method:

$a_1 = -2e^{-\zeta_d \omega_d/f_s} \cos(\sqrt{1-\zeta_d^2} \omega_d/f_s);$ $a_2 = e^{-2\zeta_d \omega_d/f_s};$ $b_1 = -2e^{-\zeta \omega_n/f_s} \cos(\sqrt{1-\zeta^2} \omega_n/f_s);$ and $b_2 = e^{-2\zeta \omega_n/f_s}.$ 2. The method according to claim 1, wherein, after inputting the output signal to a motor, the method further comprises:
if a similarity between the expected motor vibration curve and an actual vibration curve of the motor is less than a preset similarity threshold, inputting, after performing amplitude adjustment on the output signal obtained after processing by the equalizer, the output signal to the motor again to control vibration of the motor, until the similarity between the expected motor vibration curve and the actual vibration curve of the motor is greater than or equal to the preset similarity threshold.

3. The method according to claim 2, wherein the method further comprises:
measuring a maximum amplitude A1 of the actual vibration curve of the motor, and obtaining a difference A3 between A1 and a maximum amplitude A2 of the expected motor vibration curve; and
determining that the similarity between the expected motor vibration curve and the actual vibration curve of the motor is less than the preset similarity threshold if A3 is greater than a preset threshold.

4. The method according to claim 3, wherein, after obtaining an output signal after processing by the equalizer, before inputting the output signal to a motor, the method further comprises:
performing amplitude adjustment on the entire output signal with equal proportions to form a normalized excitation signal; and
adjusting an amplitude of the excitation signal based on a preset initial amplitude proportion factor;
the inputting the output signal to a motor is specifically:
inputting the excitation signal whose amplitude is adjusted to the motor; and
the inputting, after performing amplitude adjustment on the output signal obtained after processing by the equalizer, the output signal to the motor again to control vibration of the motor specifically comprises:
adjusting an amplitude coefficient of the excitation signal; and
inputting the excitation signal whose amplitude coefficient is adjusted to the motor again to control vibration of the motor.

5. The method according to claim 2, wherein the actual vibration curve of the motor is obtained via a laser distance measurement sensor.

6. The method according to claim 3, wherein the actual vibration curve of the motor is obtained via a laser distance measurement sensor.

7. The method according to claim 4, wherein the actual vibration curve of the motor is obtained via a laser distance measurement sensor.

8. The method according to claim 2, wherein the actual vibration curve of the motor is obtained via a Hall sensor.

9. The method according to claim 3, wherein the actual vibration curve of the motor is obtained via a Hall sensor.

10. The method according to claim 4, wherein the actual vibration curve of the motor is obtained via a Hall sensor.

11. An apparatus for controlling motor vibration, comprising:
at least one processor; and
a memory communicably connected with the at least one processor;
wherein the memory stores instructions executable by the at least one processor, the instructions, when executed by the at least one processor, cause the at least one processor to perform the method for controlling motor vibration according to claim 1.

* * * * *